US009933813B2

United States Patent
Ohishi et al.

(10) Patent No.: US 9,933,813 B2
(45) Date of Patent: Apr. 3, 2018

(54) INFORMATION PROCESSING APPARATUS

(71) Applicant: FUJITSU LIMITED, Kawasaki-shi, Kanagawa (JP)

(72) Inventors: Shintaro Ohishi, Kawasaki (JP); Masato Hoshi, Kawasaki (JP); Yutaka Sato, Kawasaki (JP); Tadanori Tachikawa, Hachioji (JP); Noritaka Hara, Kamakura (JP); Masuo Ohnishi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/416,159

(22) Filed: Jan. 26, 2017

(65) Prior Publication Data

US 2017/0220066 A1    Aug. 3, 2017

(30) Foreign Application Priority Data

Jan. 29, 2016  (JP) .................................. 2016-016070

(51) Int. Cl.
G06F 1/16    (2006.01)

(52) U.S. Cl.
CPC .......... G06F 1/1618 (2013.01); G06F 1/1681 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,644,320 A * | 7/1997 | Rossi | .................... | G06F 1/1616 343/702 |
| 5,684,672 A * | 11/1997 | Karidis | ................. | G06F 1/1616 343/702 |
| 6,421,235 B2 * | 7/2002 | Ditzik | .................. | G06F 1/1616 320/114 |
| 6,628,236 B2 * | 9/2003 | Kim | ....................... | G06F 1/1616 343/702 |
| 6,788,529 B2 * | 9/2004 | Homer | .................. | G06F 1/1616 312/223.2 |
| 7,450,075 B2 * | 11/2008 | Kim | ........................ | H01Q 1/08 343/702 |
| 7,579,993 B2 * | 8/2009 | Lev | ........................ | H01Q 1/084 343/702 |
| 7,911,397 B2 * | 3/2011 | Degner | .................. | H01Q 1/084 343/702 |

(Continued)

FOREIGN PATENT DOCUMENTS

| | | |
|---|---|---|
| JP | 2011-220397 A | 11/2011 |
| JP | 2015-46115 A | 3/2015 |

*Primary Examiner* — Lisa Lea Edmonds
(74) *Attorney, Agent, or Firm* — Westerman, Hattori, Daniels & Adrian, LLP

(57) ABSTRACT

An information processing apparatus includes a first housing, a second housing including an antenna, and a hinge member including a first shaft on a side of the first housing, and a second shaft parallel to the first shaft and on a side of the second housing, the hinge member coupling the first housing and the second housing such that the first housing and the second housing are rotatable 360 degrees, wherein, in a state where a rotation angle between the first housing and the second housing is 360 degrees, the second shaft is located at a position nearer than the first shaft to a free end side of the first housing, and the antenna protrudes beyond the first housing.

11 Claims, 21 Drawing Sheets

(56) References Cited

U.S. PATENT DOCUMENTS

| | | | |
|---|---|---|---|
| 8,427,375 B2* | 4/2013 | Sato | G06F 1/162 |
| | | | 343/702 |
| 9,128,664 B1* | 9/2015 | Tabone | G06F 1/1616 |
| 9,348,362 B2* | 5/2016 | Ko | G06F 1/1626 |
| 2012/0162040 A1* | 6/2012 | Taura | G06F 1/1698 |
| | | | 343/770 |
| 2015/0062808 A1 | 3/2015 | Abe et al. | |
| 2015/0133188 A1* | 5/2015 | Chang | G06F 1/1698 |
| | | | 455/556.1 |
| 2015/0362958 A1* | 12/2015 | Shang | G06F 1/1681 |
| | | | 361/679.58 |
| 2016/0010374 A1* | 1/2016 | Hsu | G06F 1/16 |
| | | | 74/414 |
| 2016/0083988 A1* | 3/2016 | Hsu | G06F 1/1681 |
| | | | 361/679.01 |

* cited by examiner

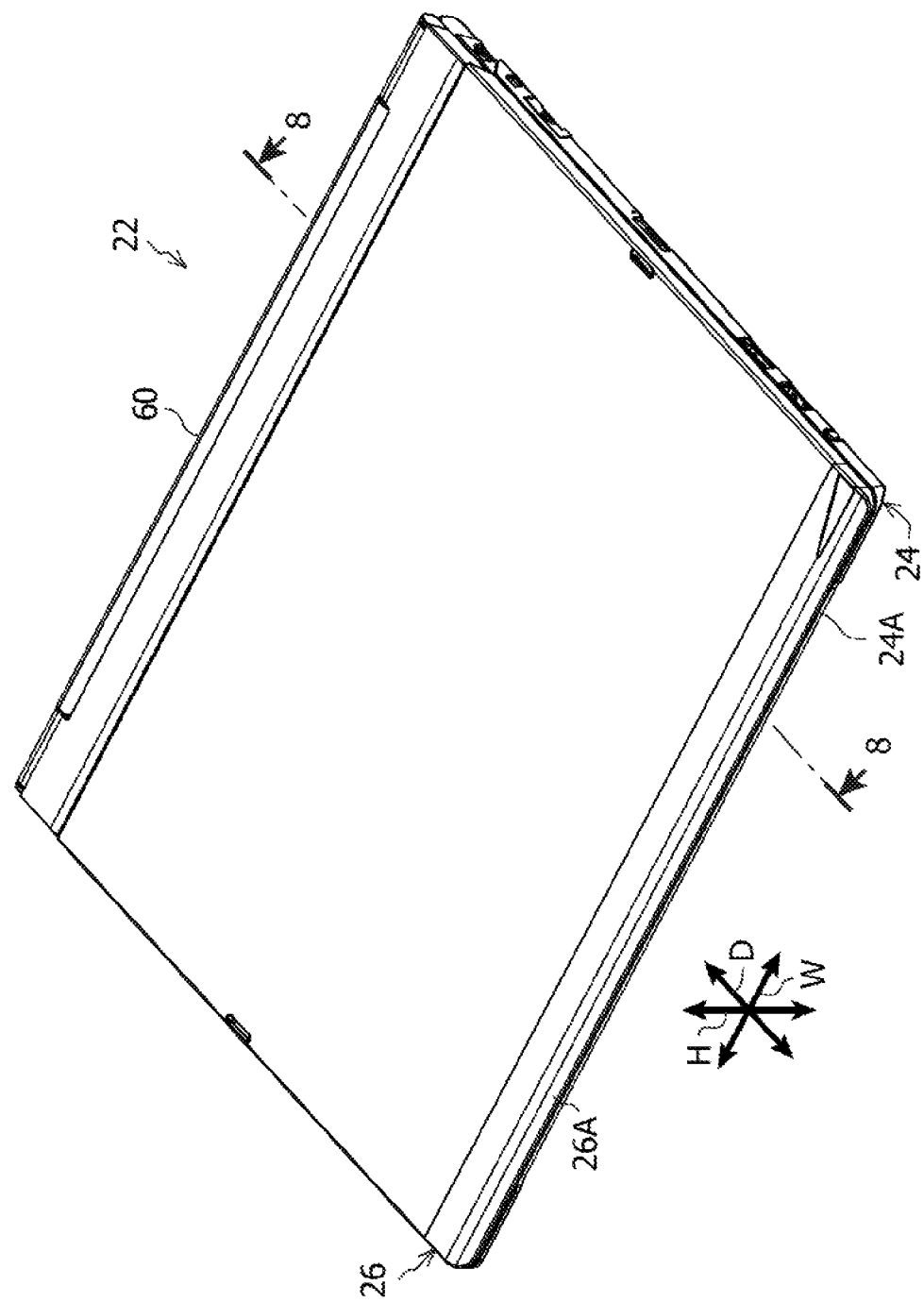

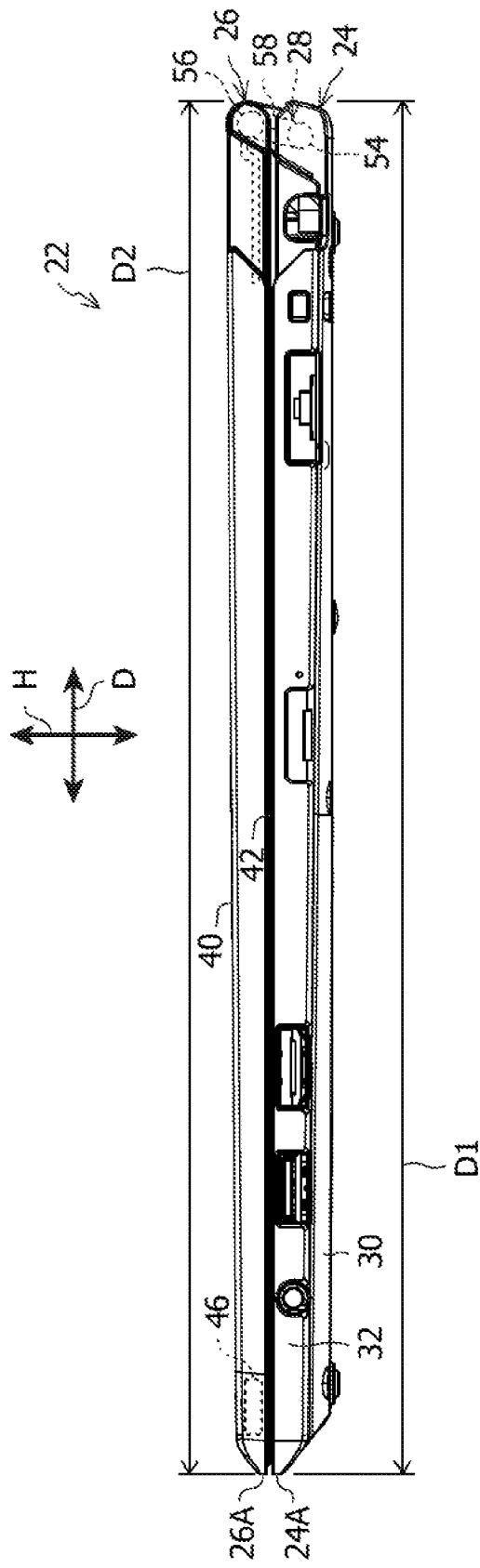

INFORMATION PROCESSING APPARATUS

CROSS-REFERENCE TO RELATED APPLICATION

This application is based upon and claims the benefit of priority of the prior Japanese Patent Application No. 2016-016070, filed on Jan. 29, 2016, the entire contents of which are incorporated herein by reference.

FIELD

The embodiments discussed herein are related to an information processing apparatus.

BACKGROUND

There is portable equipment in which a first housing is rotatably connected to a connecting member with a first hinge interposed therebetween, a second housing is rotatably connected to the connecting member with a second hinge interposed therebetween, and the first hinge and the second hinge are arranged such that their rotation shafts are parallel.

With a structure in which two housings are connected with a hinge member (parallel double-shaft hinge) having two shafts parallel to each other, one of the housings can be rotated 360 degrees with respect to the other housing. In the case where the housings are made of a metal, the thickness of the housings having a desired shape and strength can be decreased.

An example of the related art is disclosed in Japanese Laid-open Patent Publication No. 2011-220397.

SUMMARY

According to an aspect of the invention, an information processing apparatus includes a first housing, a second housing including an antenna, and a hinge member including a first shaft on a side of the first housing, and a second shaft parallel to the first shaft and on a side of the second housing, the hinge member coupling the first housing and the second housing such that the first housing and the second housing are rotatable 360 degrees, wherein, in a state where a rotation angle between the first housing and the second housing is 360 degrees, the second shaft is located at a position nearer than the first shaft to a free end side of the first housing, and the antenna protrudes beyond the first housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a perspective view of a computer according to a first embodiment;

FIG. 2A is a side view of the computer according to the first embodiment;

DESCRIPTION OF EMBODIMENTS

In a fully opened state where a rotation angle between two housings is 360 degrees, when an antenna disposed in one of the housings overlaps the other housing made of a metal, radio waves sent or to be received by the antenna are blocked by the other housing made of a metal, and there is a risk of a decrease in the sensitivity of the antenna.

An object of the present disclosure, as an aspect, is to suppress a decrease in the sensitivity of the antenna disposed in the one housing in a fully opened state of 360 degrees in a structure in which the two housings are connected such that the housings are rotatable 360 degrees.

An information processing apparatus according to a first embodiment will be described in detail with reference to the drawings. As illustrated in FIG. 1 to FIG. 8, a computer 22 according to the embodiment is a computer that can be used either in the form of, for example, a note-type computer or a tablet-type computer, which is an example of the information processing apparatus. Another example of the information processing apparatus may be a clamshell type cellular phone.

Figure 4:
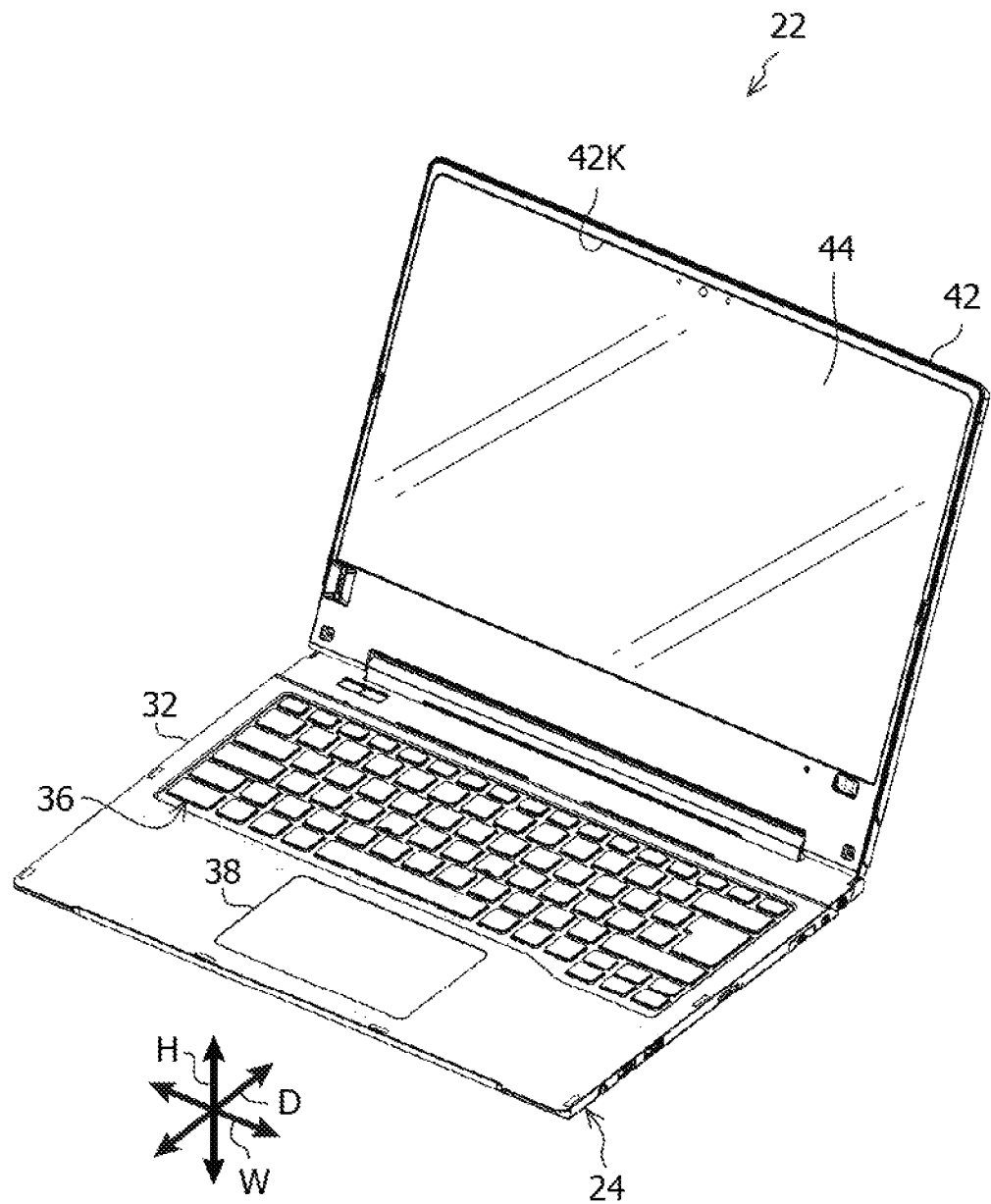
FIG. 4 is a perspective view of the computer according to the first embodiment.

The computer 22 includes a body-side housing 24 and a display-side housing 26. The body-side housing 24 is an example of a first housing, and the display-side housing 26 is an example of a second housing. In the drawings, the width direction, depth direction, and height direction of the computer 22 are denoted by arrows W, D, and H, respectively. As illustrated in FIG. 2A and FIG. 4, in a state where the body-side housing 24 is placed on a desk or a stand, the width direction, depth direction, and height direction of the computer 22 coincide with the width direction, depth direction, and thickness direction of the body-side housing 24.

The body-side housing 24 and the display-side housing 26 are connected to each other by using hinge members 28. An end of the body-side housing 24 and an end of the display-side housing 26 opposite the ends thereof that are connected to the hinge members 28 are free ends 24A and 26A, respectively. The side of the free end 24A of the body-side housing 24 is a front side of a user of the computer 22, and the side of the hinge members 28 is a far side.

Figure 3:
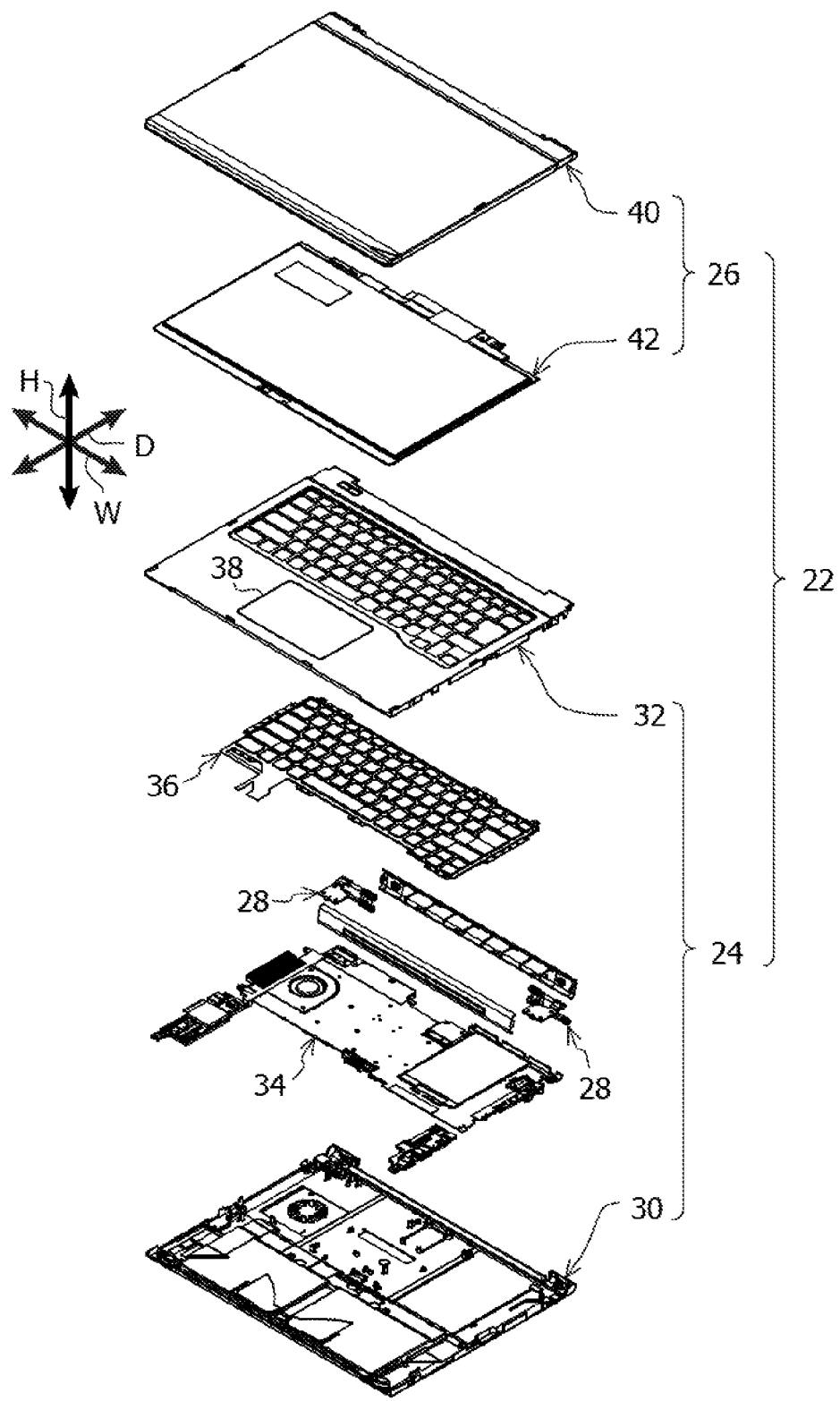
FIG. 3 is an exploded perspective view of the computer according to the first embodiment.

In the embodiment, as illustrated in FIG. 3, the body-side housing 24 includes two frames 30 and 32. The frames 30 and 32 are made of a metal. In the case where the frames 30 and 32 are made of a metal, the thickness of the body-side housing 24 can be decreased and the body-side housing 24 can be stiffened.

Figure 5:
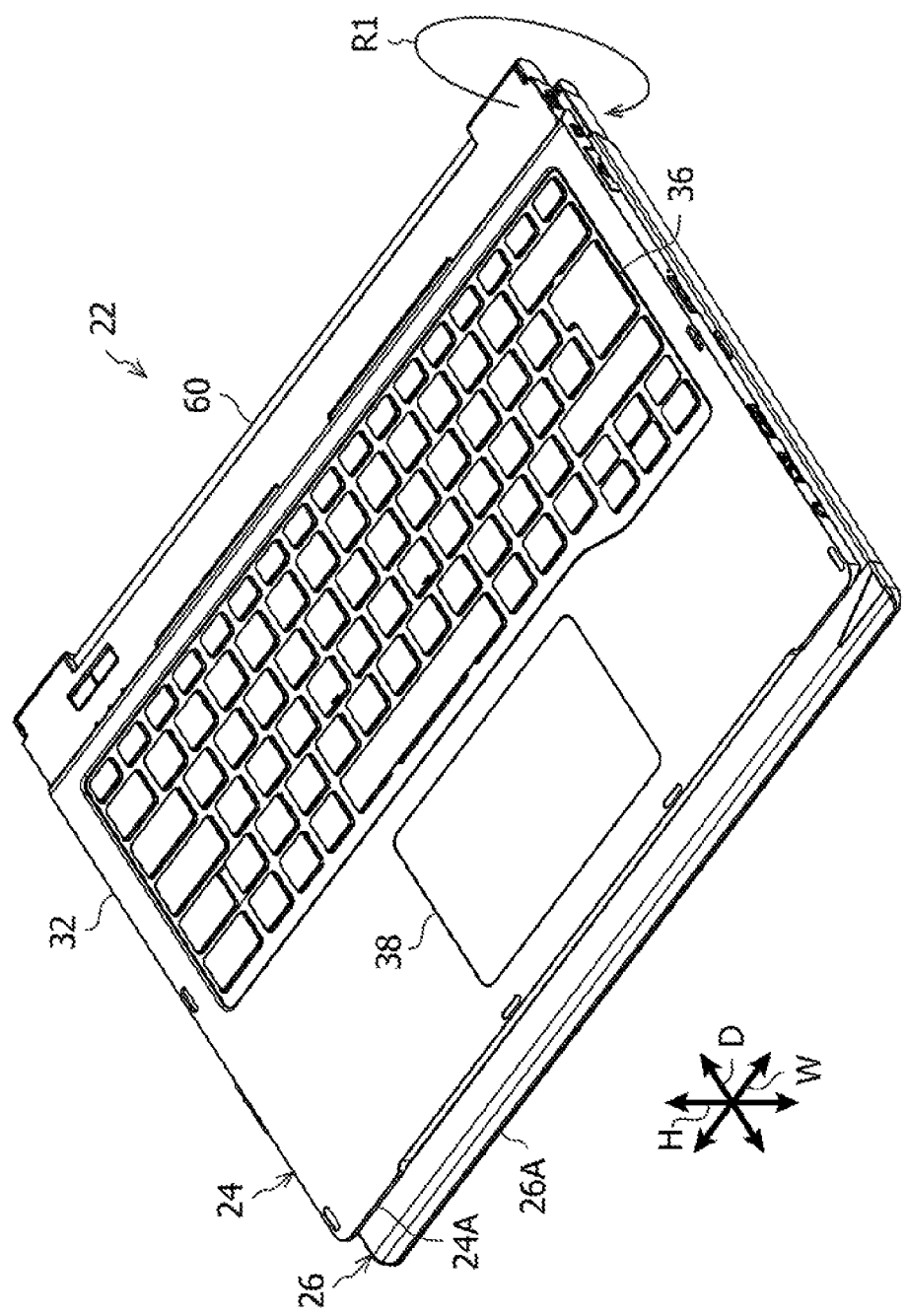
FIG. 5 is a perspective view of the computer according to the first embodiment.
Figure 6:
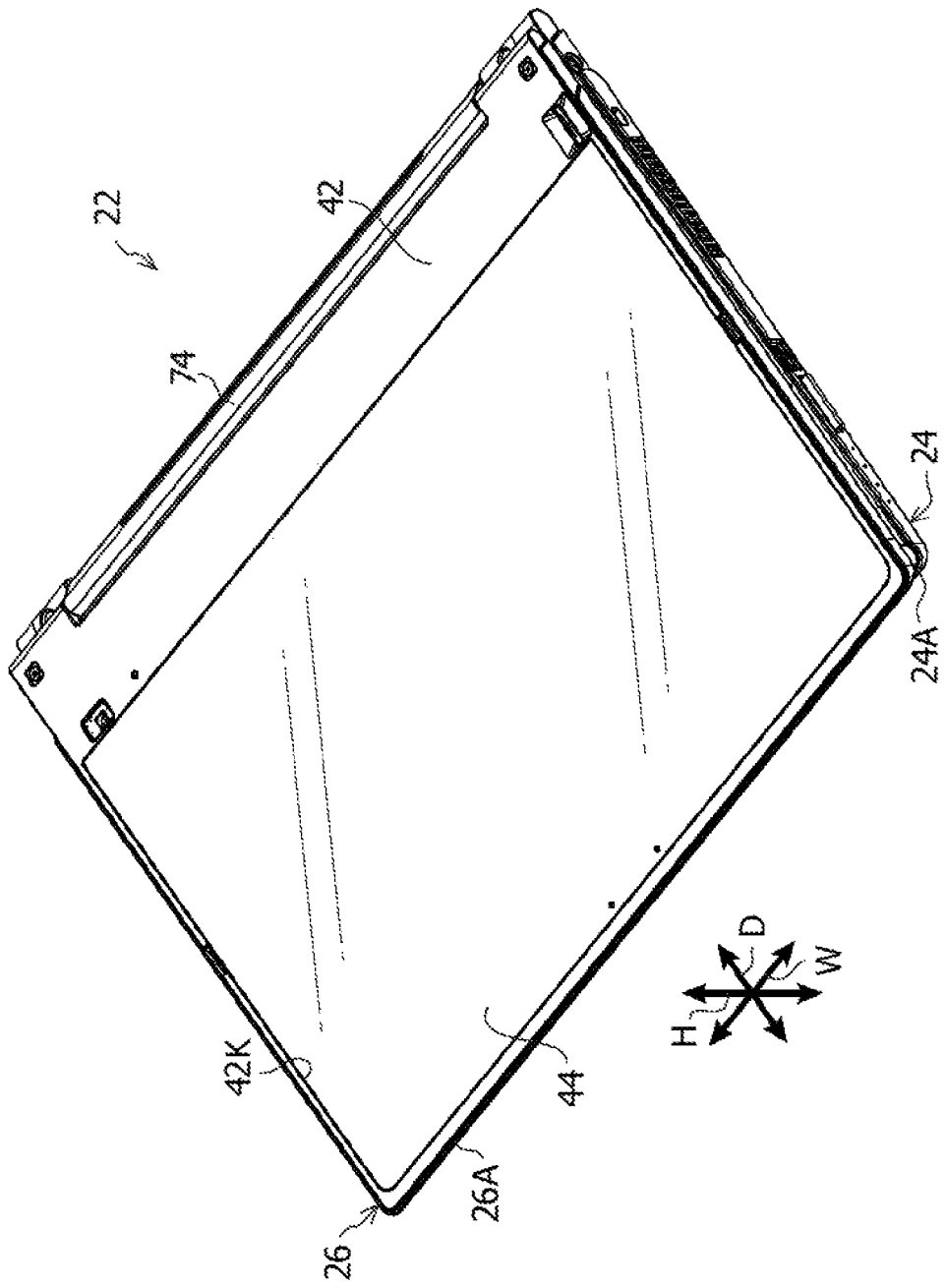
FIG. 6 is a perspective view of the computer according to the first embodiment.

A substrate 34 is disposed in the inside of the body-side housing 24 with the two frames 30 and 32 joined. A processor, a memory, a connector, an input device, an output device, and other components are mounted on the substrate 34. A keyboard 36 and a touchpad 38 illustrated in FIG. 3 to FIG. 5 are examples of the input device.

The display-side housing 26 includes two frames 40 and 42 and a display 44 attached to the frame 42. As illustrated in FIG. 4, the frame 42 has a frame-like shape, and a user can see contents displayed on the display 44 from an opening portion 42K of the frame 42.

As illustrated in FIG. 2A, the display-side housing 26 includes an antenna 46 in the inside thereof. In the embodiment, the antenna 46 is disposed between the frames 40 and 42 and near the free end 26A. The computer 22 sends and receives radio waves to and from various external equipment by using the antenna 46.

Figure 2B:
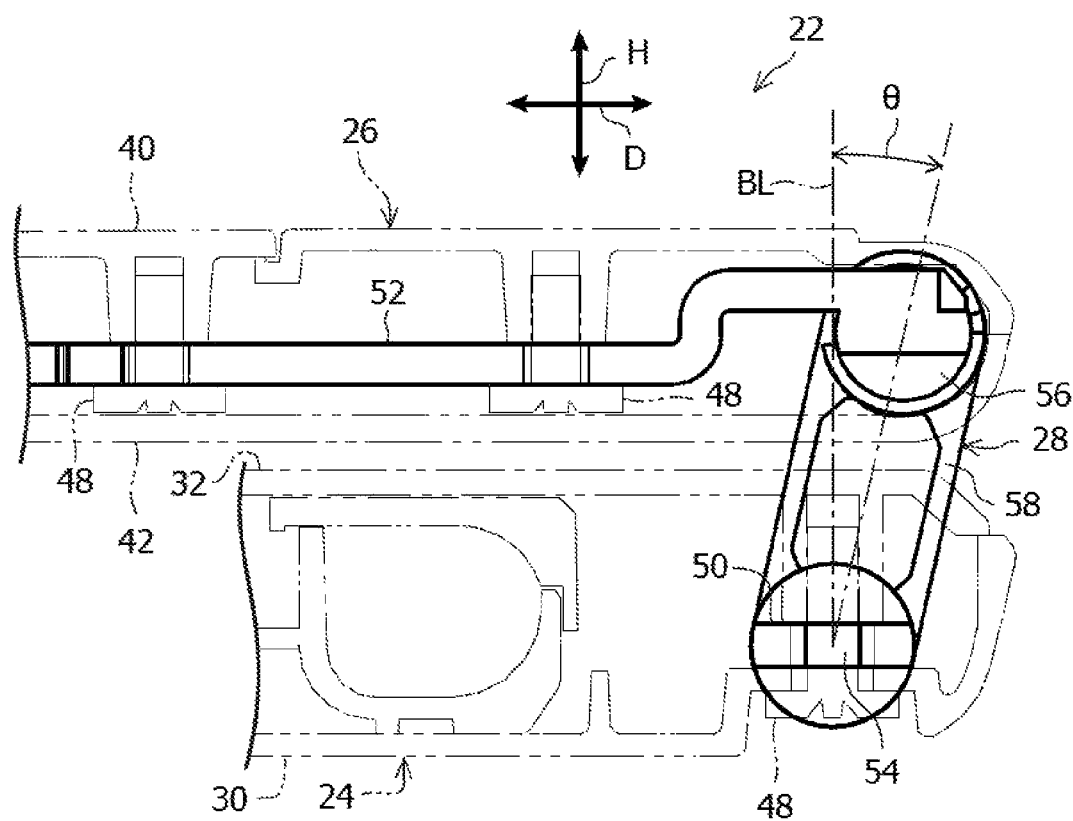
FIG. 2B is an enlarged side view of part of the computer according to the first embodiment.
Figure 7A:
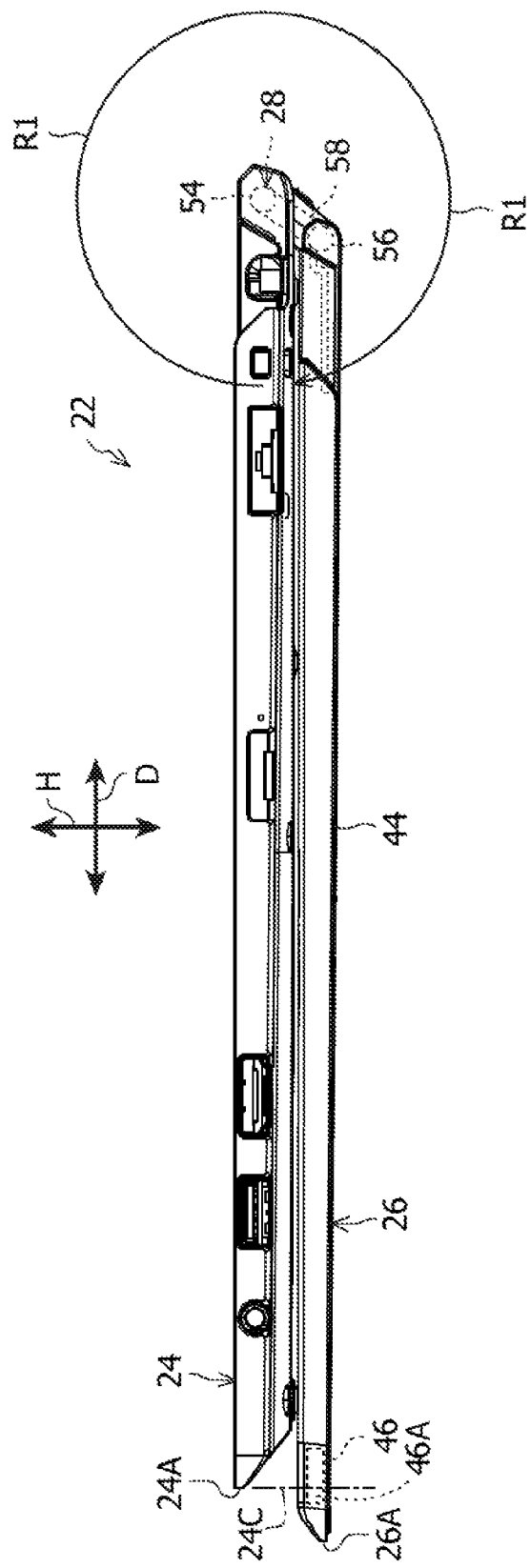
FIG. 7A is a side view of the computer according to the first embodiment.
Figure 7B:
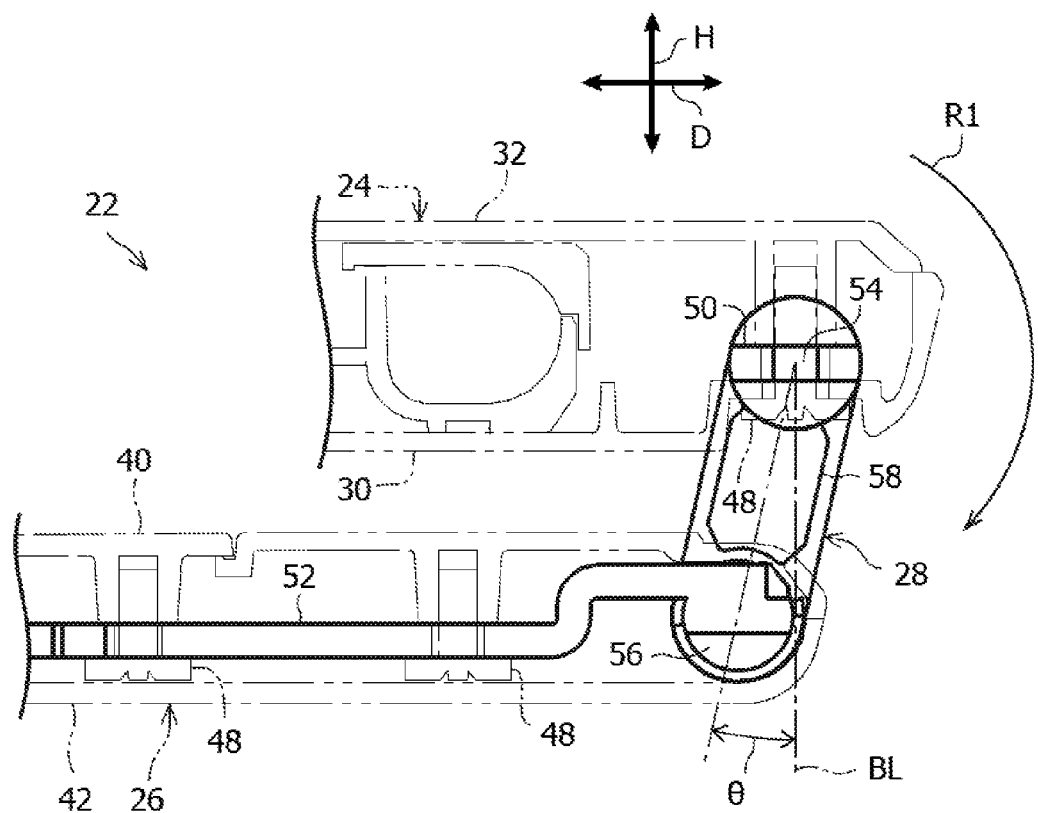
FIG. 7B is an enlarged side view of part of the computer according to the first embodiment.
Figure 8:
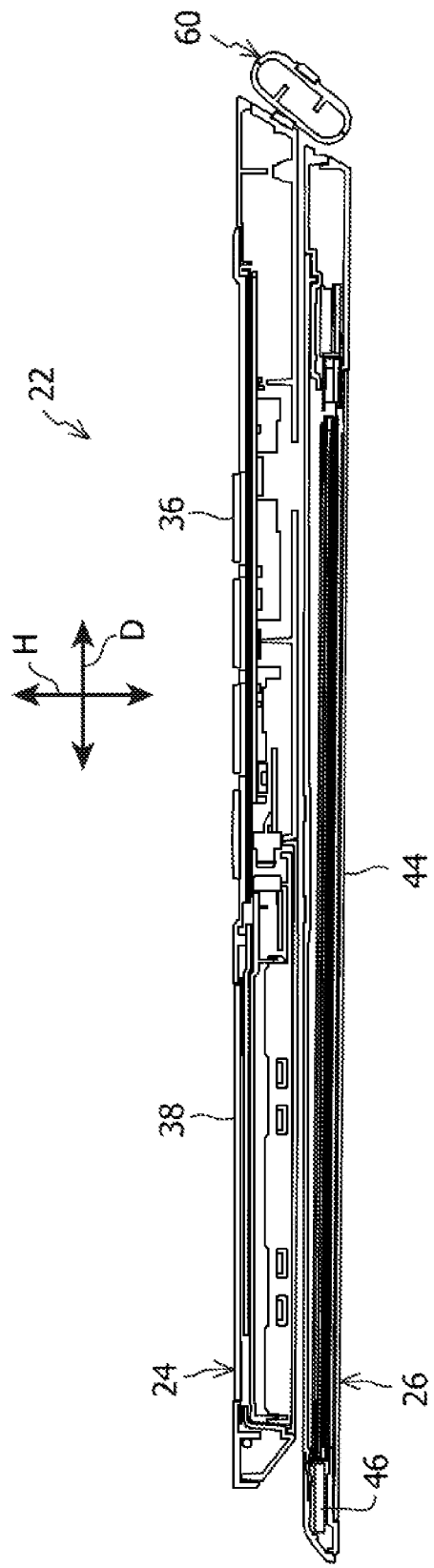
FIG. 8 is a sectional view of the computer according to the first embodiment taken along line VIII-VIII in FIG. 1.
Figure 9:
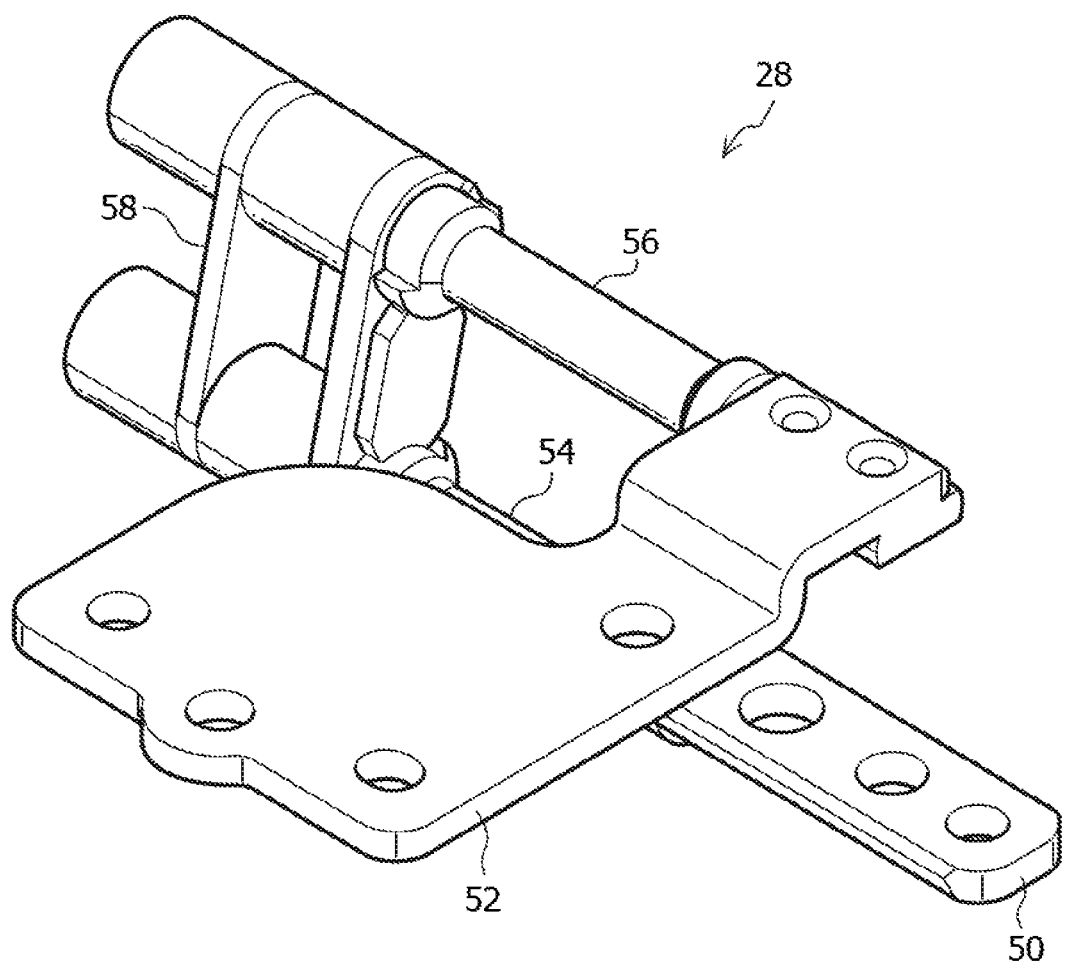
FIG. 9 is a perspective view of a hinge member of the computer according to the first embodiment.

As illustrated in FIG. 2B, FIG. 7B, and FIG. 9, each of the hinge members 28 includes a body-side attachment plate 50 attached to the body-side housing 24 and a display-side attachment plate 52 attached to the display-side housing 26. The hinge members 28 are attached to the body-side housing 24 and the display-side housing 26 by using, for example, screws 48.

The body-side attachment plate 50 includes a body-side rotation shaft 54, and the display-side attachment plate 52 includes a display-side rotation shaft 56 parallel to the body-side rotation shaft 54. The body-side rotation shaft 54 and the display-side rotation shaft 56 are connected to each other by using a link 58.

Thus, the body-side housing 24 and the display-side housing 26 are connected to each other by using the hinge members 28 having the two parallel shafts. Accordingly, as illustrated by an arrow R1, the display-side housing 26 can be rotated 360 degrees with respect to the body-side housing 24 from a fully closed state illustrated in FIG. 2A to a fully opened state illustrated in FIG. 7B. Rotation of the body-side housing 24 and the display-side housing 26 is relative, and it can be said that the body-side housing 24 is rotated 360 degrees with respect to the display-side housing 26.

As illustrated in FIG. 1, in the fully closed state, the display-side housing 26 overlaps the body-side housing 24 with the display 44 (see FIG. 4) facing the keyboard 36 (see FIG. 4 as well). In the fully closed state, the outer edge of the display-side housing 26 is located inside the outer edge of the body-side housing 24, or the positions of these outer edges substantially match when viewed in the thickness direction of the body-side housing 24. As illustrated in FIG. 2A, the depth D2 of the display-side housing 26 is equal to or less than the depth D1 of the body-side housing 24 in a side view of the computer 22.

In the fully closed state, the position of the free end 26A of the display-side housing 26 in the depth direction is the same as the position of the free end 24A of the body-side housing 24.

In the fully closed state, the frames 30 and 32 of the body-side housing 24 overlap the antenna 46 when viewed in the thickness direction of the body-side housing 24.

The axial direction of the body-side rotation shaft 54 and the display-side rotation shaft 56 coincides with the width direction (direction of an arrow W) of the body-side housing 24.

As illustrated in FIG. 2A and FIG. 2B, in the fully closed state, the display-side rotation shaft 56 is located at a position (first position) farther than the body-side rotation shaft 54 from the free end 24A of the body-side housing 24. Accordingly, as illustrated in FIG. 2B, the link 58 is inclined at a predetermined angle θ toward the far side with respect to a reference line BL passing through the body-side rotationshaft 4 in the thickness direction of the body-side housing 24.

In the state where the computer 22 is in the fully opened state, as illustrated in FIG. 7A and FIG. 7B, the link 58 is rotated 180 degrees about the body-side rotation shaft 54 in the direction of the arrow R1. That is, in the fully opened state, the display-side rotation shaft 56 is located at a position (second position rotated 180 degrees from the first position) nearer than the body-side rotation shaft 54 to the free end 24A of the body-side housing 24. As illustrated in FIG. 7B, the link 58 is inclined at an angle θ toward the front side with respect to the reference line BL.

In the fully opened state, the display-side rotation shaft 56 is thus located at a position nearer than the body-side rotation shaft 54 to the free end 24A of the body-side housing 24, and accordingly, the position of the display-side housing 26 shifts more than the body-side housing 24 toward the front side. As illustrated in FIG. 7A, the whole or part (a portion 46A on the side of the free end 26A) of the antenna 46 disposed in the display-side housing 26 protrudes beyond the free end 24A (see the position denoted by a one-dot chain line 24C) of the body-side housing 24 toward the front side.

In the embodiment, two of the hinge members 28 are disposed in the computer 22 at an interval in the width direction. That is, the body-side housing 24 and the display-side housing 26 are rotatably connected to each other at two separated positions in the width direction.

A hinge cover 60 is disposed between the hinge members 28. The hinge cover 60 covers parts (portions protruding beyond the body-side housing 24 and the display-side housing 26) of the hinge members 28. The hinge cover 60 is connected to the body-side housing 24 and the display-side housing 26 between the hinge members 28 such that the computer 22 has an integrated appearance.

The effects of the embodiment will now be described.

The computer 22 includes the body-side housing 24 and the display-side housing 26 that are connected to each other by using the hinge members 28. As illustrated in FIG. 1 and FIG. 2A, in the fully closed state, the display 44 faces the keyboard 36 of the body-side housing 24, and the display-side housing 26 overlaps the body-side housing 24.

As illustrated in FIG. 3, the computer 22 according to the embodiment includes the two hinge members 28 disposed at an interval in the width direction (direction of the arrow W). Accordingly, unsteadiness during rotation can be suppressed in contrast with, for example, a structure in which the body-side housing 24 and the display-side housing 26 are connected to each other by using a single hinge member.

The computer 22 includes the hinge cover 60. Since the hinge cover 60 covers parts of the hinge members 28, the hinge cover 60, the body-side housing 24, and the display-side housing 26 have the integrated appearance.

Each of the hinge members 28 has two shafts (the body-side rotation shaft 54 and the display-side rotation shaft 56). Accordingly, the display-side housing 26 of the computer 22 is rotatable 360 degrees with respect to the body-side housing 24 from the fully closed state illustrated in FIG. 2A and FIG. 2B to the fully opened state illustrated in FIG. 7A and FIG. 7B.

Figure 10A:
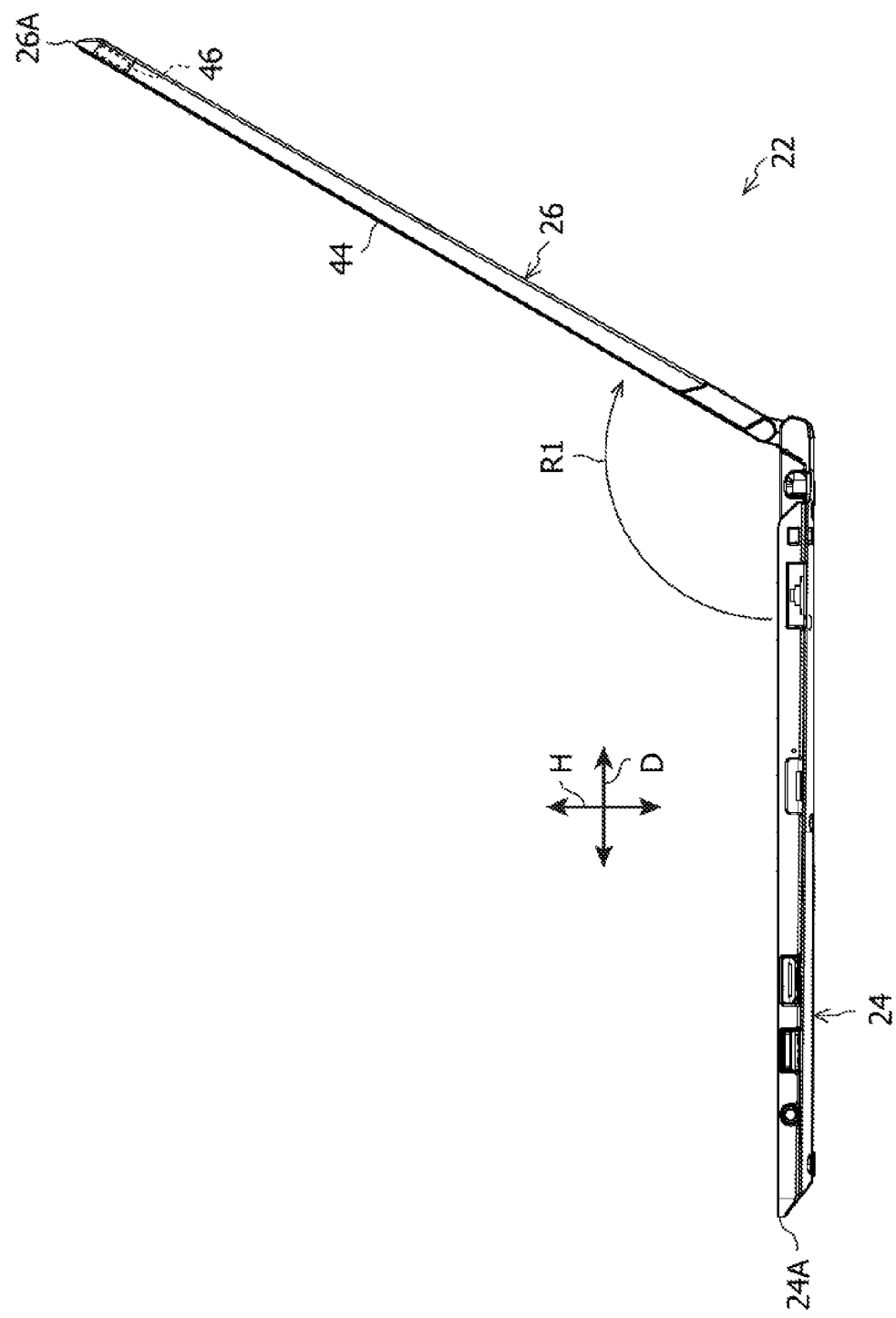
FIG. 10A is a side view of the computer according to the first embodiment.
Figure 10B:
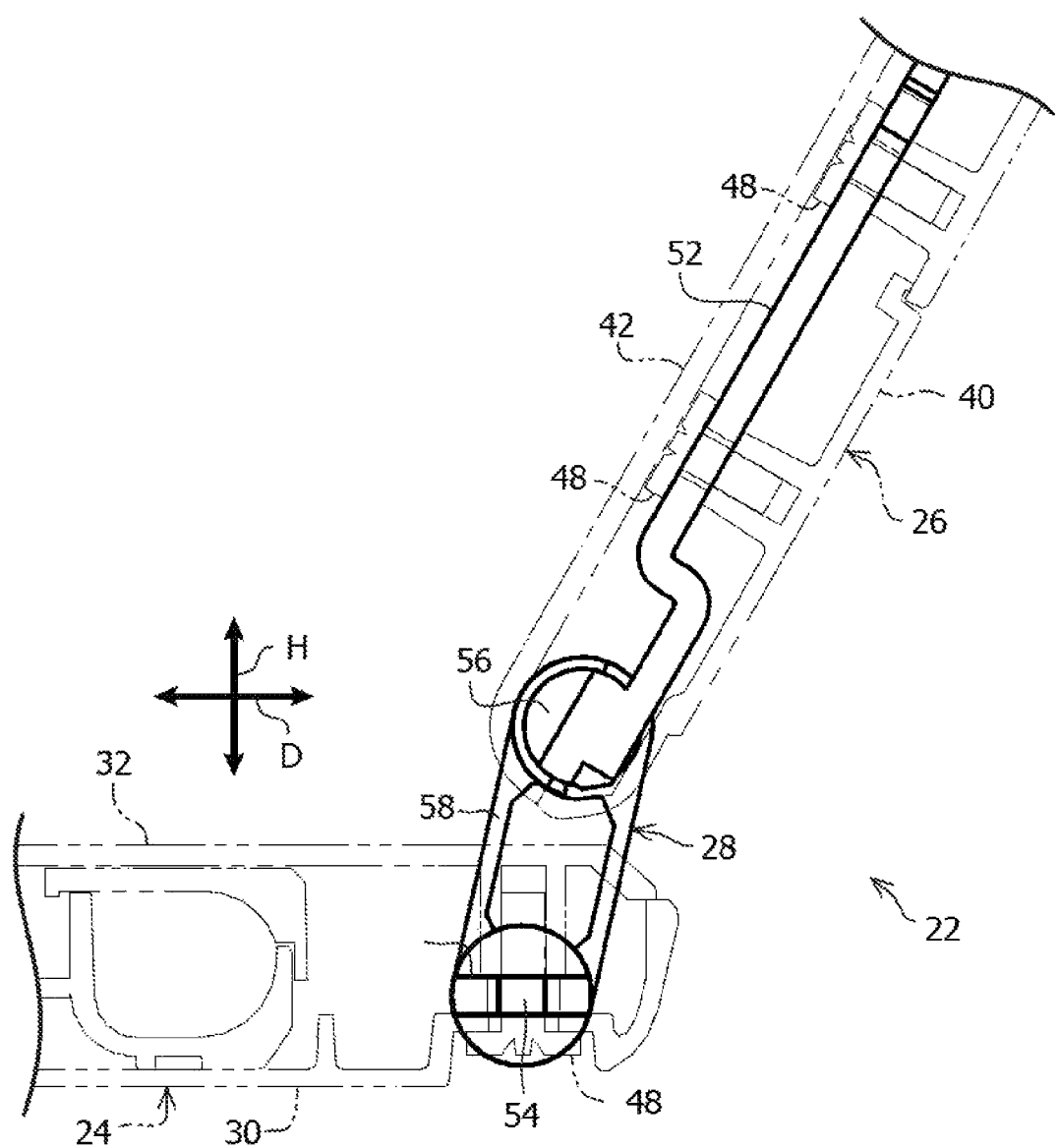
FIG. 10B is an enlarged side view of part of the computer according to the first embodiment.

During rotation of the display-side housing 26 with respect to the body-side housing 24, as illustrated in FIG. 10A and FIG. 10B, the computer 22 can be in a state where the display-side housing 26 is rotated by a predetermined angle (for example, 120 degrees) about the display-side rotation shaft 56 in the direction of the arrow R1. In this state, a user located on the front side can see the display 44, which the display-side housing 26 includes.

In addition, in the state illustrated in FIG. 10A, a user can readily operate the keyboard 36 while seeing the display 44.

Figure 11A:
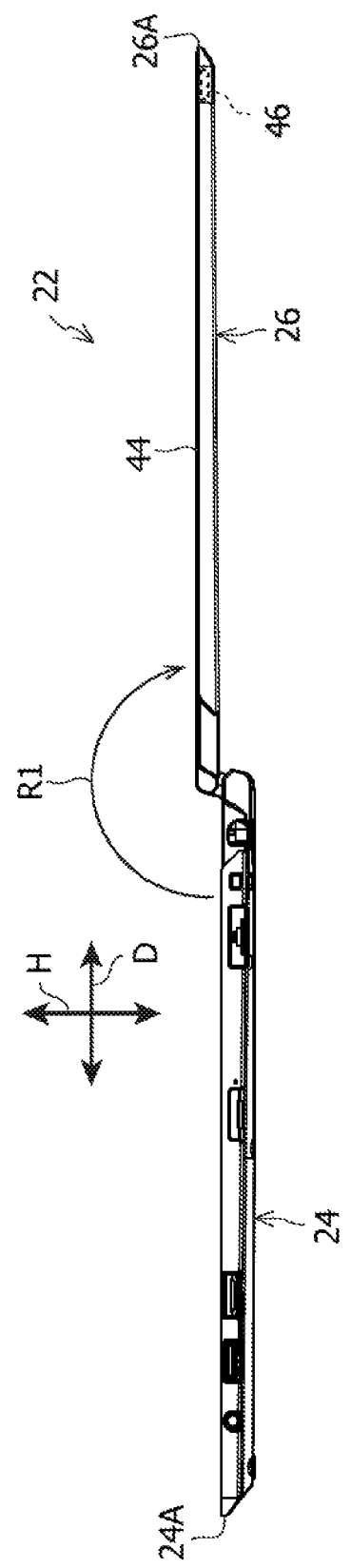
FIG. 11A is a side view of the computer according to the first embodiment.
Figure 11B:
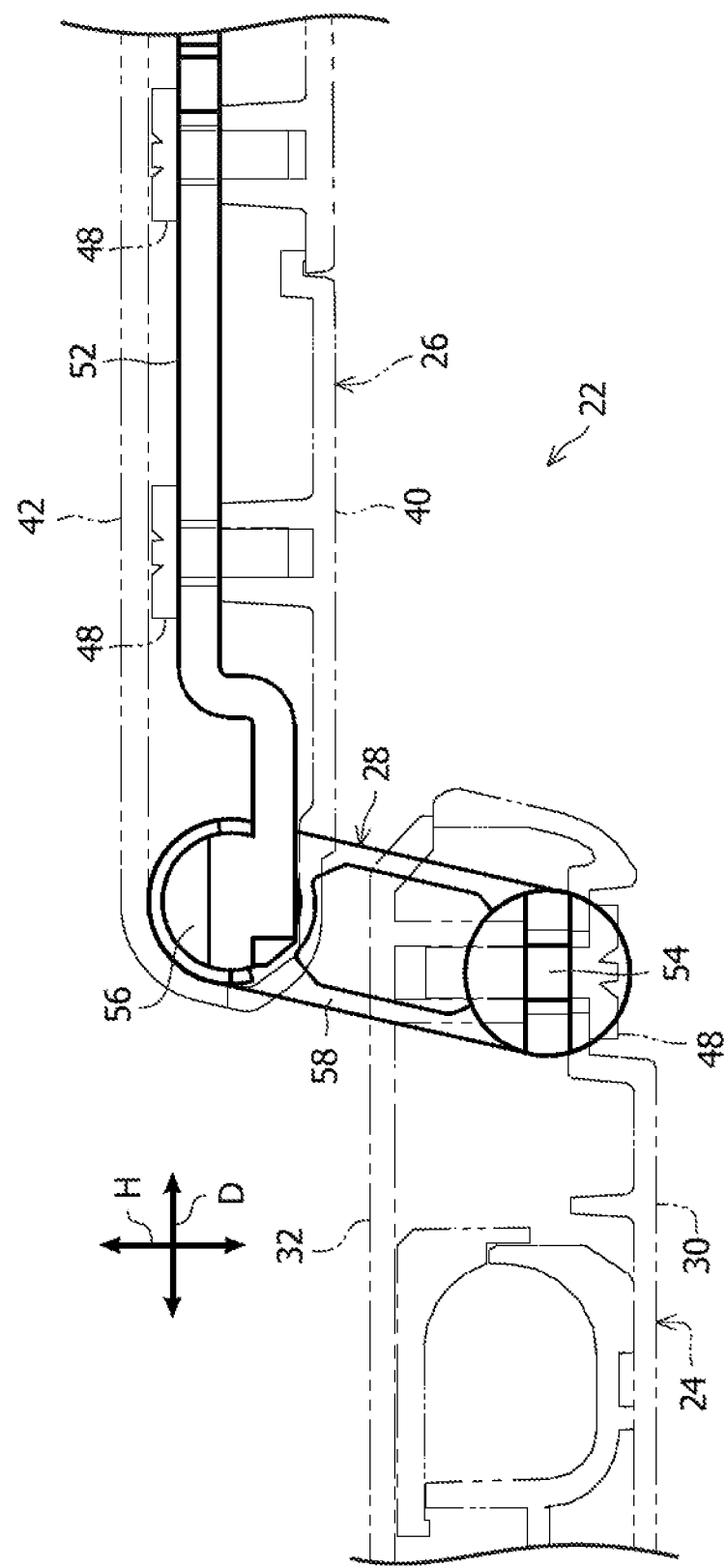
FIG. 11B is an enlarged side view of part of the computer according to the first embodiment.

As illustrated in FIG. 11A and FIG. 11B, the computer 22 can be in a state where the display-side housing 26 is further rotated 60 degrees about the display-side rotation shaft 56 in the direction of the arrow R1. The rotation angle of the display-side housing 26 is 180 degrees when the fully closed state is used as the point of reference.

Figure 12A:
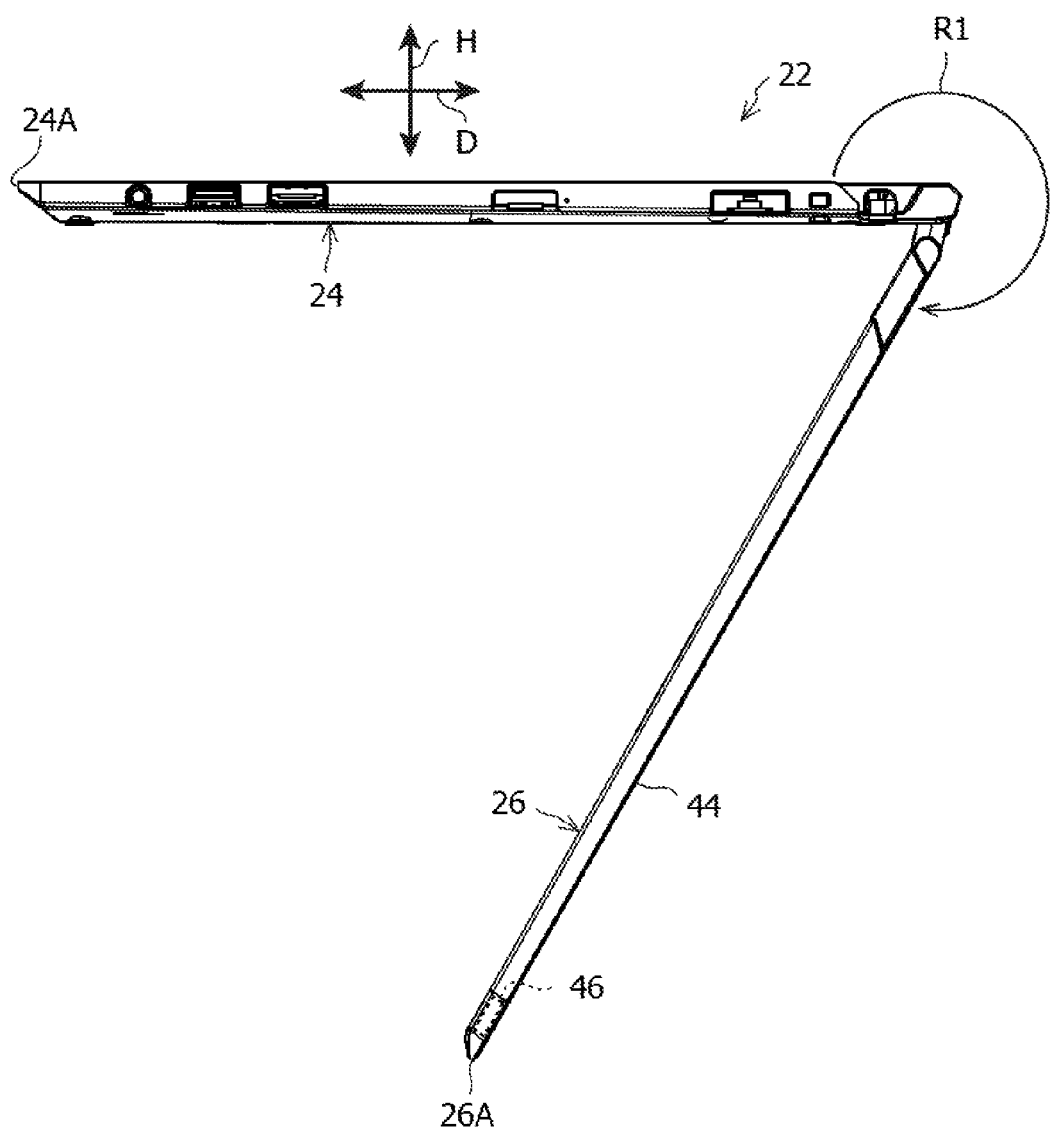
FIG. 12A is a side view of the computer according to the first embodiment.
Figure 12B:
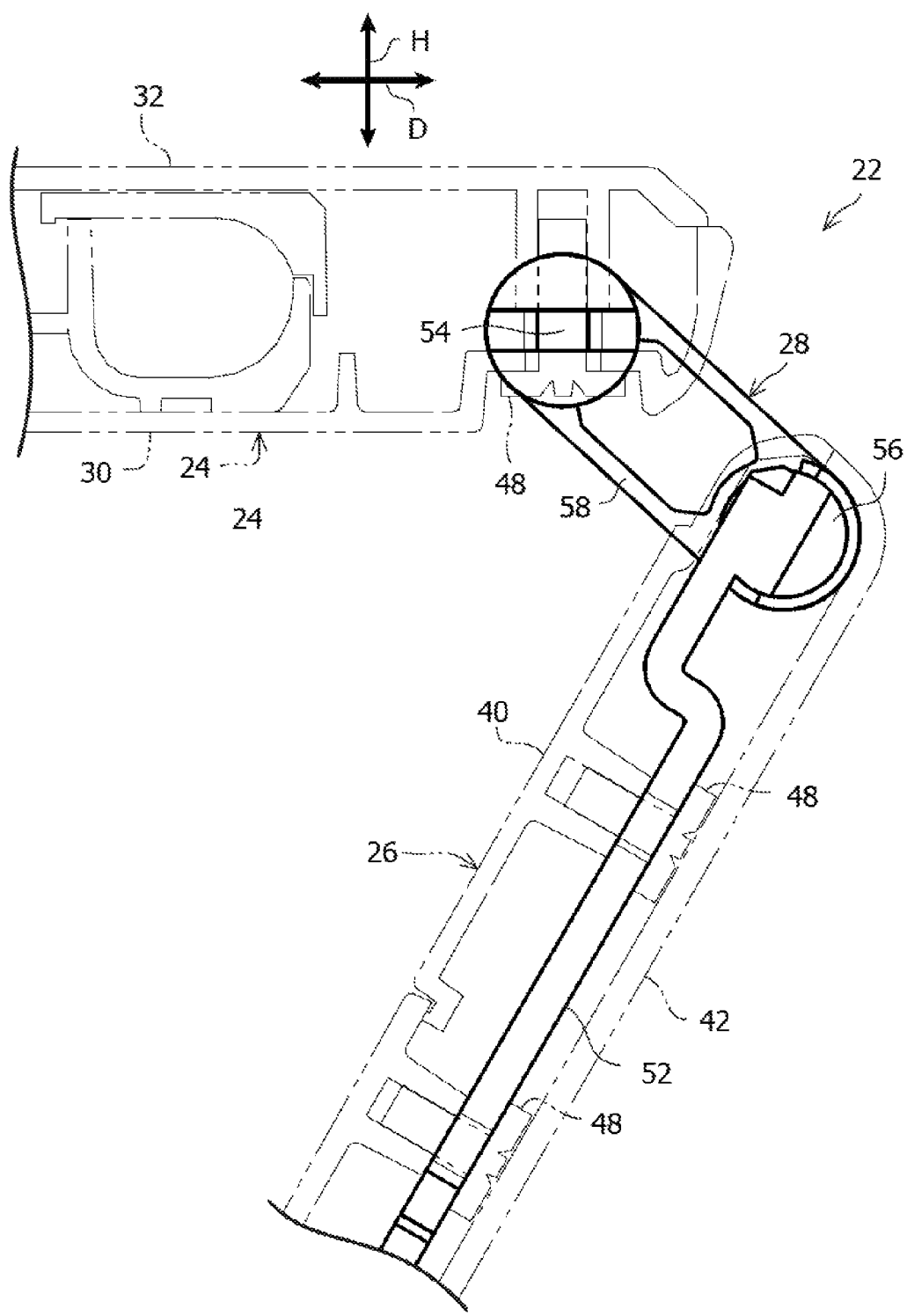
FIG. 12B is an enlarged side view of part of the computer according to the first embodiment.

As illustrated in FIG. 12A and FIG. 12B, the display-side housing 26 of the computer 22 can be further rotated about the body-side rotation shaft 54 in the direction of the arrow R1. At this time, the link 58 and the display-side rotation shaft 56 are rotated together about the body-side rotation shaft 54. In the state illustrated in FIG. 12A and FIG. 12B, the rotation angle of the display-side housing 26 is 300 degrees when the fully closed state is used as the point of reference.

As illustrated in FIG. 7A and FIG. 7B, the computer 22 is in a state where the link 58 is rotated 180 degrees about the body-side rotation shaft 54. This state is the fully opened state, in which the display-side housing 26 is rotated 360 degrees with respect to the body-side housing 24 when the fully closed state is used as the point of reference. In the fully opened state, the computer 22 has a plate shape as a whole and is accordingly easy to carry. In addition, in the fully opened state, the display 44 is located on the opposite side of the body-side housing 24, that is, on the outside, and accordingly, a user can see the display 44.

In the fully opened state, the display-side rotation shaft 56 is located at a position nearer than the body-side rotation shaft 54 to the free end 24A of the body-side housing 24. Accordingly, the portion 46A of the antenna 46 disposed on the side of the free end 26A of the display-side housing 26 protrudes beyond the body-side housing 24 when viewed in the thickness direction of the body-side housing 24. Consequently, the body-side housing 24 is unlikely to block radio waves sent or to be received by the antenna 46 in contrast with a structure in which the antenna 46 does not protrude beyond the body-side housing 24, and a decrease in the sensitivity of the antenna 46 can be suppressed.

In the case where the body-side housing 24 (frames 30 and 32) is molded with a metal and a resin, there is a possibility that manufacture thereof becomes difficult and that the thickness is increased to ensure the strength. In the embodiment, since the frames 30 and 32 of the body-side housing 24 are made of a metal, the thickness of the body-side housing 24 can be decreased and the body-side housing 24 can be stiffened.

Although the body-side housing 24 is made of a metal, a decrease in the sensitivity of the antenna 46 can be suppressed because the antenna 46 protrudes beyond the body-side housing 24 in the fully opened state of the computer 22.

In the embodiment, in the fully closed state, the position of the outer edge of the display-side housing 26 substantially matches the position of the outer edge of the body-side housing 24, and the display-side housing 26 does not protrude beyond the body-side housing 24 to the outside when viewed in the thickness direction of the body-side housing 24. In other words, in the fully closed state, the display-side housing 26 is located inside the body-side housing 24. Since the display-side housing 26 does not protrude beyond the body-side housing 24 to the outside, there is no obstructive protruding portion, and easy conveyance is achieved.

In the embodiment, in particular, the depth D2 of the display-side housing 26 is equal to or less than the depth D1 of the body-side housing 24 in the fully closed state. This enables a structure in which the display-side housing 26 does not protrude beyond the body-side housing 24 in the depth direction (the front side and the far side) in the fully closed state to be realized.

Even in the structure in which the display-side housing 26 does not protrude beyond the body-side housing 24 to the outside or the depth D2 is equal to or less than the depth D1 in the fully closed state, the antenna 46 can protrude beyond the body-side housing 24 in the fully opened state.

In the display-side housing 26, the antenna 46 is disposed on the side of the free end 26A. This enables a structure in which part of the antenna 46 protrudes beyond the body-side housing 24 to be realized in a manner in which the position of the display-side housing 26 is shifted slightly more than the body-side housing 24 toward the front side in the fully opened state, in contrast with a structure in which the antenna 46 is disposed at the center of the display-side housing 26 in the depth direction.

In the embodiment, as illustrated in FIG. 2A and FIG. 2B, in the fully closed state, the display-side rotation shaft 56 is located at a position farther than the body-side rotation shaft 54 from the free end 24A. As illustrated in FIG. 11A and FIG. 11B, also in a state where the rotation angle of the display-side housing 26 with respect to the body-side housing 24 is 180 degrees, the display-side rotation shaft 56 is located at a position farther than the body-side rotation shaft 54 from the free end 24A. When the display-side housing 26 is rotated 180 degrees about the body-side housing 24 in the direction of the arrow R1 from this state, the display-side rotation shaft 56 is also rotated 180 degrees about the body-side rotation shaft 54. That is, a structure in which the display-side rotation shaft 56 is located at a position nearer than the body-side rotation shaft 54 to the free end 24A can be realized in the fully opened state. The display-side rotation shaft 56 does not have to be rotated more than 180 degrees to locate the display-side rotation shaft 56 at a position nearer than the body-side rotation shaft 54 to the free end 24A in the fully opened state.

The computer 22 according to the embodiment includes the hinge cover 60. The hinge cover 60 covers portions of the hinge members 28 protruding beyond the body-side housing 24 and the display-side housing 26. Thus, the hinge cover 60 connected to the body-side housing 24 and the display-side housing 26 between the hinge members 28 has the integrated appearance, and accordingly, the appearance is good.

A second embodiment will now be described. In the second embodiment, factors, components, and others like to those in the first embodiment are represented by like symbols, and a detailed description thereof is omitted.

Figure 13:
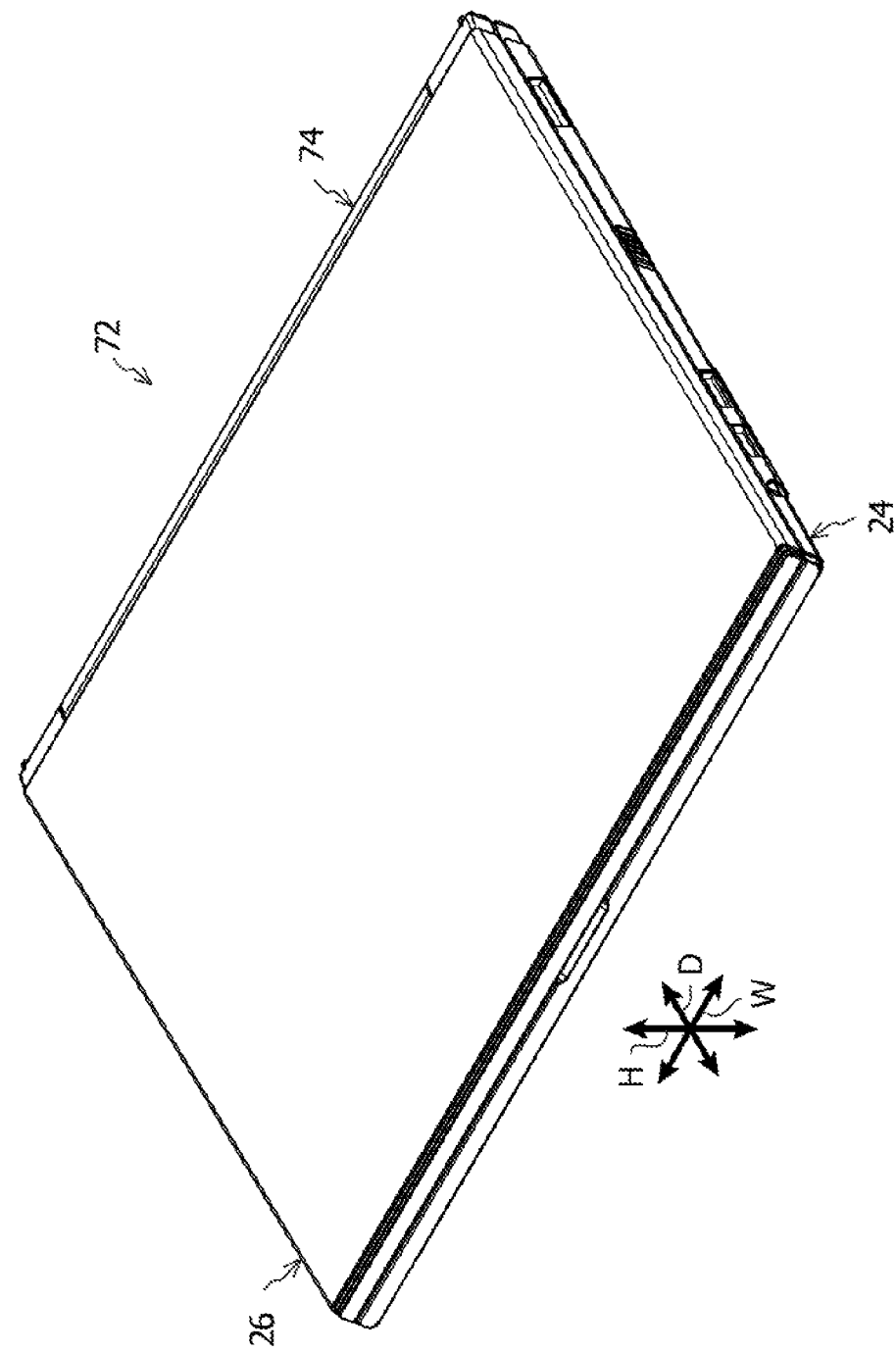
FIG. 13 is a perspective view of a computer according to a second embodiment.
Figure 14:
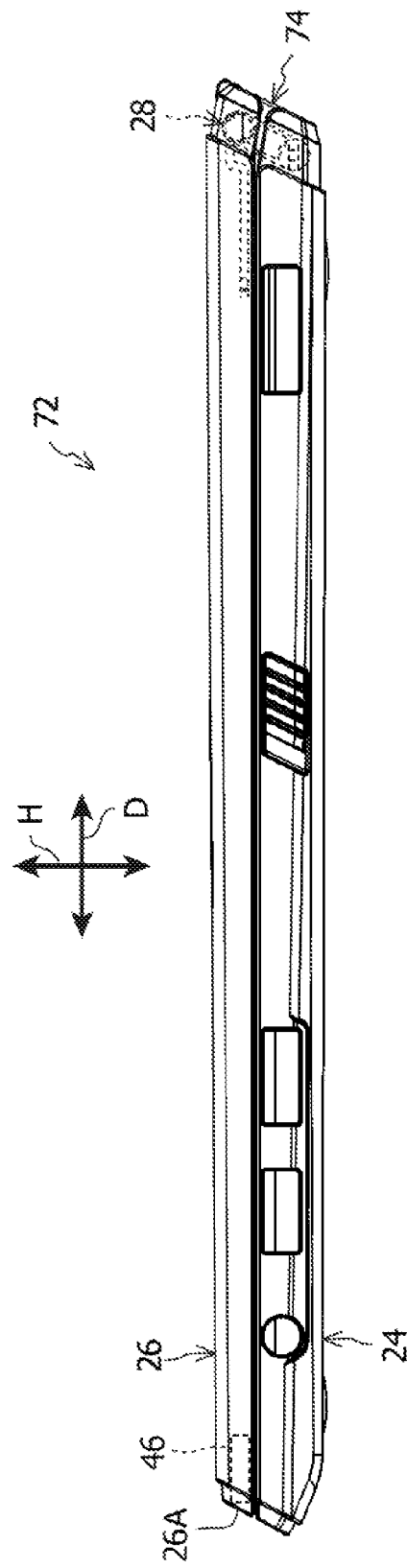
FIG. 14 is a side view of the computer according to the second embodiment.

Also, in a computer 72 according to the second embodiment, the body-side housing 24 and the display-side housing 26 are connected to each other by using the hinge members 28. The display-side housing 26 is rotated from the fully closed state illustrated in FIG. 13 and FIG. 14, and thus, the computer 72 can be in the fully opened state as illustrated in FIG. 15 and FIG. 16.

Figure 15:
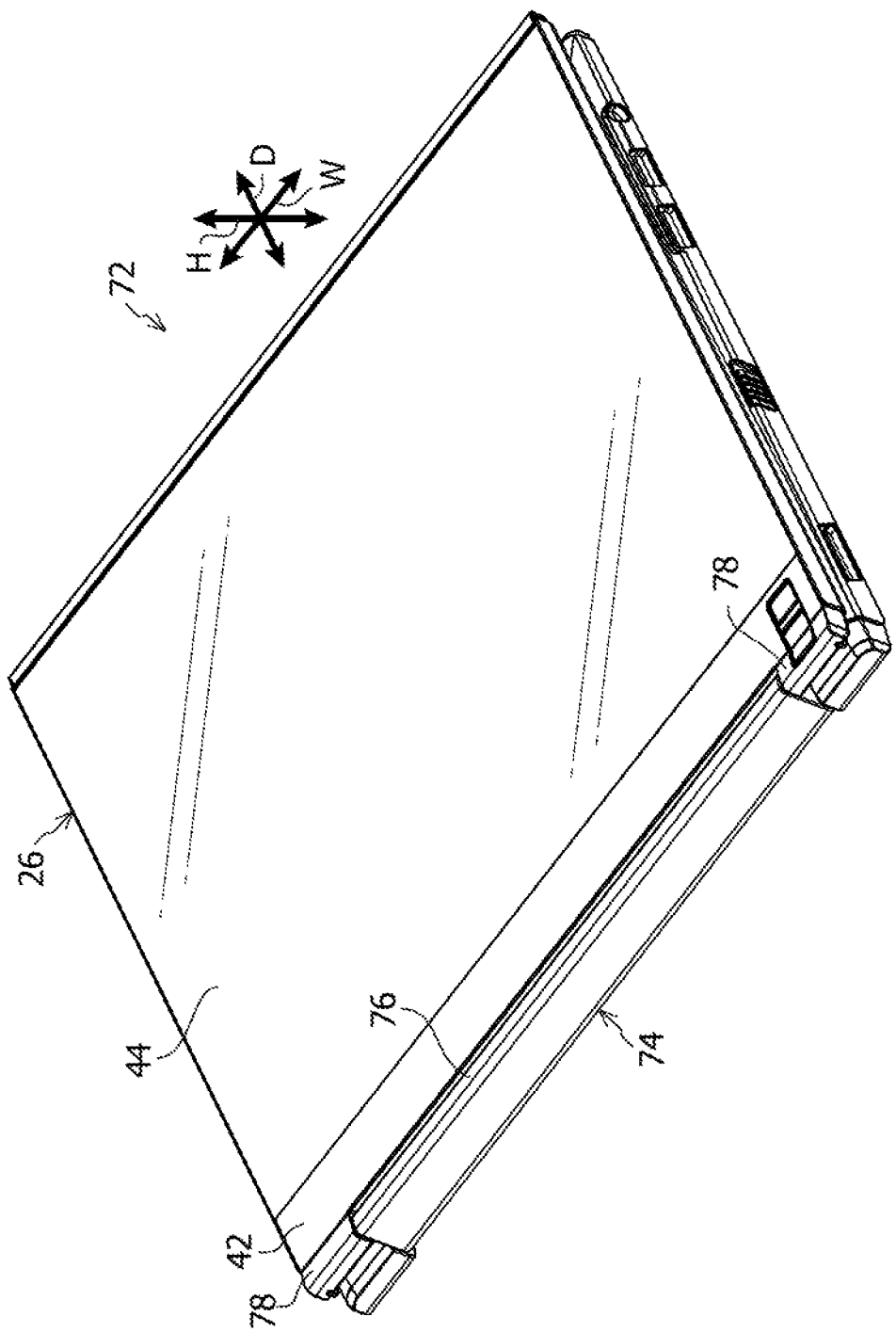
FIG. 15 is a perspective view of the computer according to the second embodiment.
Figure 16:
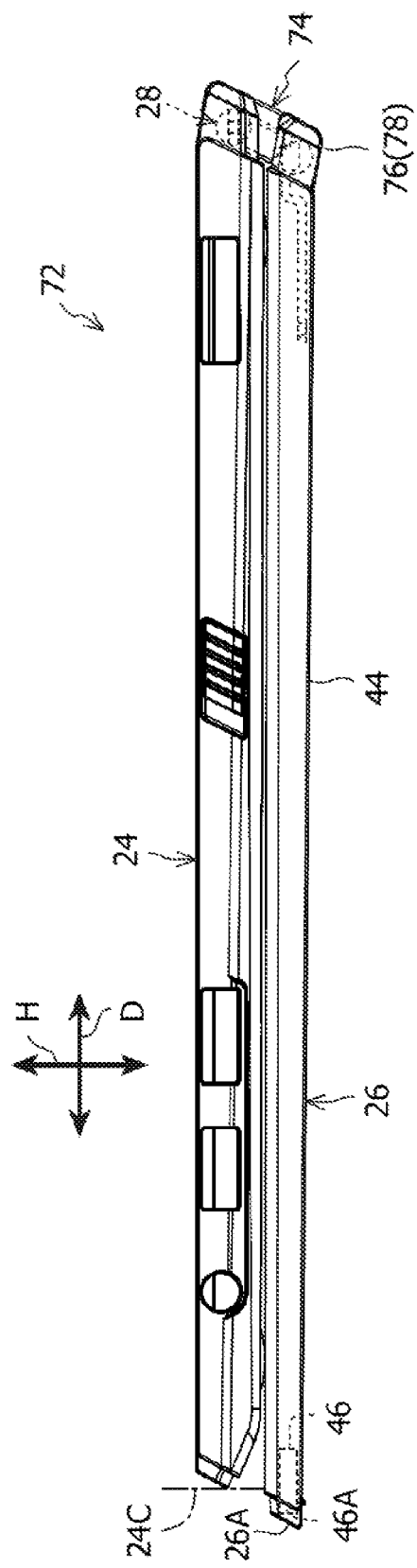
FIG. 16 is a side view of the computer according to the second embodiment.

As illustrated in FIG. 15 and FIG. 16, in the computer 72 according to the second embodiment, a protrusion 76 is formed on a hinge cover 74. In the fully opened state of the computer 72, the protrusion 76 protrudes in the direction away from the body-side housing 24.

Protruding portions 78 having the same shape as the protrusion 76 in a side view of the computer 72 in the fully opened state are formed on the frame 42 of the display-side housing 26. That is, the protrusion 76 and the protruding portions 78 are portions of the computer 72 that partially protrude to the outside in the fully opened state.

In the second embodiment, formation of the protrusion 76 allows a user of the computer 72 to use the protrusion 76 as a handle in the fully opened state. The computer 72 has a better handling property (is easier to hold) and is easier to carry than a computer including no protrusion 76.

In the second embodiment, the protruding portions 78 are also formed, and accordingly, the protruding portions 78 can be used as handles. The handling property is much better than in the case of a structure including no protruding portions 78.

Although the embodiment of the technique in the present disclosure is described above, the technique in the present disclosure is not limited thereto, and various modifications, of course, can be made without departing from the concept thereof to carry out the technique.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first housing;
a second housing including an antenna; and
a hinge member including
a first shaft on a side of the first housing, and
a second shaft parallel to the first shaft and on a side of the second housing, the hinge member coupling the first housing and the second housing such that the first housing and the second housing are rotatable 360 degrees,
wherein, in a state where a rotation angle between the first housing and the second housing is 360 degrees, the second shaft is located at a position nearer than the first shaft to a free end side of the first housing, and the antenna protrudes beyond the first housing.

2. The information processing apparatus according to claim 1,
wherein the first housing includes a metallic frame that overlaps the antenna when viewed in a thickness direction of the first housing in a state where the rotation angle is 0 degrees.

3. The information processing apparatus according to claim 1,
wherein, in a state where the rotation angle is 0 degrees, a depth of the second housing is equal to or less than a depth of the first housing.

4. The information processing apparatus according to claim 3,
wherein, in a state where the rotation angle is 360 degrees, the second housing is located inside an outer edge of the first housing when viewed in a thickness direction of the first housing.

5. The information processing apparatus according to claim 1,
wherein the antenna is disposed on a free end side of the second housing.

6. The information processing apparatus according to claim 3,
wherein, in a state where the rotation angle is 0 degrees, the second shaft is located at a first position farther than the first shaft from the free end of the first housing, and, in a state where the rotation angle is 360 degrees, the second shaft is located at a second position rotated 180 degrees about the first shaft from the first position.

7. The information processing apparatus according to claim 1,
wherein the second housing includes a display.

8. The information processing apparatus according to claim 7,
wherein, in a state where the rotation angle is 360 degrees, the display is located on an oppose side of the first housing.

9. The information processing apparatus according to claim 1, further comprising a hinge cover that covers the hinge member.

10. The information processing apparatus according to claim 9,
wherein a protrusion that protrudes in a thickness direction of the second housing in a state where the rotation angle is 360 degrees is formed on the hinge cover.

11. The information processing apparatus according to claim 1,
wherein two of the hinge members are disposed at an interval in a width direction of the first housing and the second housing.

* * * * *